(12) United States Patent
Xi

(10) Patent No.: US 11,184,687 B2
(45) Date of Patent: Nov. 23, 2021

(54) WEARABLE DEVICE, INFORMATION PROCESSING METHOD, APPARATUS AND SYSTEM

(71) Applicant: Baidu Online Network Technology (Beijing) Co., Ltd., Beijing (CN)

(72) Inventor: Xiaoning Xi, Beijing (CN)

(73) Assignees: Baidu Online Network Technology (Beijing) Co., Ltd., Beijing (CN); Shanghai Xiaodu Technology Co. Ltd., Shanghai (CN)

(*) Notice: Subject to any disclaimer, the term of this patent is extended or adjusted under 35 U.S.C. 154(b) by 0 days.

(21) Appl. No.: 16/351,924

(22) Filed: Mar. 13, 2019

(65) Prior Publication Data
US 2020/0007957 A1    Jan. 2, 2020

(30) Foreign Application Priority Data
Jun. 29, 2018 (CN) .......................... 201810713006.1

(51) Int. Cl.
| | |
|---|---|
| H04N 21/858 | (2011.01) |
| G06F 16/73 | (2019.01) |
| G06F 1/16 | (2006.01) |
| G06K 19/06 | (2006.01) |
| H04L 29/08 | (2006.01) |
| H04N 21/482 | (2011.01) |

(52) U.S. Cl.
CPC .......... *H04N 21/858* (2013.01); *G06F 1/163* (2013.01); *G06F 16/73* (2019.01); *G06K 19/06037* (2013.01); *H04L 67/32* (2013.01); *H04N 21/4828* (2013.01)

(58) Field of Classification Search
None
See application file for complete search history.

(56) References Cited

U.S. PATENT DOCUMENTS

| | | | | |
|---|---|---|---|---|
| 6,637,029 B1* | 10/2003 | Maissel | ............... | H04N 21/454 |
| | | | | 725/46 |
| 8,805,692 B2* | 8/2014 | Goldstein | ............... | H04W 4/80 |
| | | | | 704/275 |
| 9,436,876 B1* | 9/2016 | Carlson | .............. | G06K 9/00744 |

(Continued)

FOREIGN PATENT DOCUMENTS

| | | |
|---|---|---|
| CN | 105843839 A | 8/2016 |
| CN | 106254553 A | 12/2016 |

(Continued)

OTHER PUBLICATIONS

Jeff Byrnes; "Visual Codes Puts Your QR Codes on Apple Watch"; Published on watchaware.com, Oct. 16, 2017 (Year: 2017).*

*Primary Examiner* — James R Marandi
(74) *Attorney, Agent, or Firm* — Nixon Peabody LLP

(57) ABSTRACT

Embodiments of the present disclosure disclose a wearable device, an information processing method, apparatus and system. The wearable device includes a processor and a display screen. The processor is configured to search for a video file indicated by a video search request, in response to receiving the video search request from a user, and send an identification code for indicating an access link of the video file to the display screen; and the display screen is configured to display the identification code, so that an electronic device identifying the identification code acquires the access link.

11 Claims, 4 Drawing Sheets

(56) References Cited

U.S. PATENT DOCUMENTS

| | | | | |
|---|---|---|---|---|
| 2002/0147840 A1* | 10/2002 | Mutton | ............... | H04L 67/2823 |
| | | | | 709/239 |
| 2014/0203071 A1* | 7/2014 | Eggert | .................... | G06F 16/23 |
| | | | | 235/375 |
| 2015/0025981 A1* | 1/2015 | Zaretsky | ............. | G06F 16/9566 |
| | | | | 705/14.73 |
| 2015/0254367 A1* | 9/2015 | Kagan | ................... | G06F 16/957 |
| | | | | 707/706 |
| 2015/0348554 A1* | 12/2015 | Orr | ....................... | H04L 12/282 |
| | | | | 704/275 |
| 2016/0094276 A1* | 3/2016 | Shao | ........................ | H04W 4/80 |
| | | | | 455/41.1 |
| 2018/0152500 A1* | 5/2018 | Park | .......................... | G06T 7/70 |
| 2019/0180343 A1* | 6/2019 | Arnett | ................ | G06Q 30/0633 |
| 2021/0014575 A1* | 1/2021 | Selfors | .................. | G09B 19/06 |

FOREIGN PATENT DOCUMENTS

| | | | |
|---|---|---|---|
| JP | 2007025943 A | 2/2007 |
| JP | 2017181631 A | 10/2017 |
| JP | 2017182251 A | 10/2017 |

\* cited by examiner

WEARABLE DEVICE, INFORMATION PROCESSING METHOD, APPARATUS AND SYSTEM

CROSS-REFERENCE TO RELATED APPLICATIONS

This application claims priority to Chinese Application No. 201810713006.1, filed on Jun. 29, 2018 and entitled "Wearable Device, Information Processing Method, Apparatus and System," the entire disclosure of which is hereby incorporated by reference.

TECHNICAL FIELD

Embodiments of the present disclosure relate to the field of computer technology, specifically to the field of Internet technology, and more specifically to a wearable device, an information processing method, apparatus and system.

BACKGROUND

With the popularity of electronic devices in life, wearable electronic devices are becoming more and more popular among users because of their small size, portability, and capability of communication sessions. For example, the wearable electronic device may be a smart watch, smart glasses or a smart bracelet.

Wearable devices have two important characteristics, one is long-term wearable, and the other is intelligent. The wearable electronic devices generally have access to the Internet to achieve a variety of functions.

SUMMARY

Embodiments of the present disclosure disclose a wearable device, an information processing method, apparatus and system.

In a first aspect, the embodiments of the present disclosure provide a wearable device. The wearable device includes a processor and a display screen. The processor is configured to search for a video file indicated by a video search request, in response to receiving the video search request from a user, and send an identification code for indicating an access link of the video file to the display screen. The display screen is configured to display the identification code, so that an electronic device identifying the identification code acquires the access link.

In some embodiments, the video search request is a voice request; the processor is further configured to determine a search keyword indicated by the voice request; and the processor is further configured to search for the video file based on the search keyword.

In some embodiments, the identification code is a quick response (QR) code.

In a second aspect, the embodiments of the present disclosure provide an information processing method for a wearable device, the wearable device including a display screen, and the method includes: searching for a video file indicated by a video search request, in response to receiving the video search request from a user; and displaying an identification code for indicating an access link of the video file on the display screen, so that an electronic device identifying the identification code acquires the access link.

In some embodiments, the video search request is a voice request; the method further includes: determining a voice keyword indicated by the voice request; and the searching for a video file indicated by a video search request, includes: searching for the video file based on the voice keyword.

In some embodiments, the identification code is a quick response (QR) code.

In a third aspect, the embodiments of the present disclosure provide an information processing apparatus for a wearable device, the wearable device including a display screen, and the apparatus includes: a searching unit, configured to search for a video file indicated by a video search request, in response to receiving the video search request from a user; and a displaying unit, configured to display an identification code for indicating an access link of the video file on the display screen, so that an electronic device identifying the identification code acquires the access link.

In some embodiments, the video search request is a voice request; the apparatus further includes: a determination unit, configured to determine a voice keyword indicated by the voice request; and the searching unit is further configured to: search for the video file based on the voice keyword.

In some embodiments, the identification code is a quick response (QR) code.

In a fourth aspect, the embodiments of the present disclosure provide an information processing system, the system including a first terminal device and a wearable device having a display screen; the wearable device is configured to search for a video file indicated by a video search request, in response to receiving the video search request from a user; determine an access link of the video file, and display an identification code for indicating the access link on the display screen; and the first terminal device is configured to identify the identification code to acquire the access link.

In some embodiments, the video search request is a voice request; the wearable device is further configured to: determine a search keyword indicated by the voice request; and the wearable device is further configured to: search for the video file based on the search keyword.

In some embodiments, the identification code is a quick response (QR) code; the wearable device is further configured to display the QR code of the access link on the display screen; and the first terminal device is further configured to scan the QR code to acquire the access link.

In some embodiments, the first terminal device is further configured to scan the QR code displayed on the display screen to acquire the access link, and acquire and play the video file based on the access link.

In some embodiments, the first terminal device is further configured to send the access link to a second terminal device, so that the second terminal device plays the video file based on the access link.

In some embodiments, the first terminal device is further configured to send a video storage request including the access link to a cloud server.

In some embodiments, the system further includes a second terminal device; the first terminal device is further configured to send a video play request to the second terminal device; and the second terminal device is configured to acquire and play the video file from the cloud server, in response to receiving the video play request.

In a fifth aspect, the embodiments of the present disclosure provide a computer readable storage medium, storing a computer program thereon, the computer program, when executed by a processor, implements the method in any one of the embodiments of the information processing method for a wearable device.

The embodiments of the present disclosure provide a wearable device. The wearable device includes a processor and a display screen. The processor is configured to search for a video file indicated by a video search request, in response to receiving the video search request from a user, and send an identification code for indicating an access link of the video file to the display screen. The display screen is configured to display the identification code, so that an electronic device identifying the identification code acquires the access link. The wearable device provided by the embodiments of the present disclosure has relatively rich functions. The wearable device transmits the access link through the identification code, so that the electronic device that acquires the identification code or other electronic device that communicates with the electronic device plays the video corresponding to the access link.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
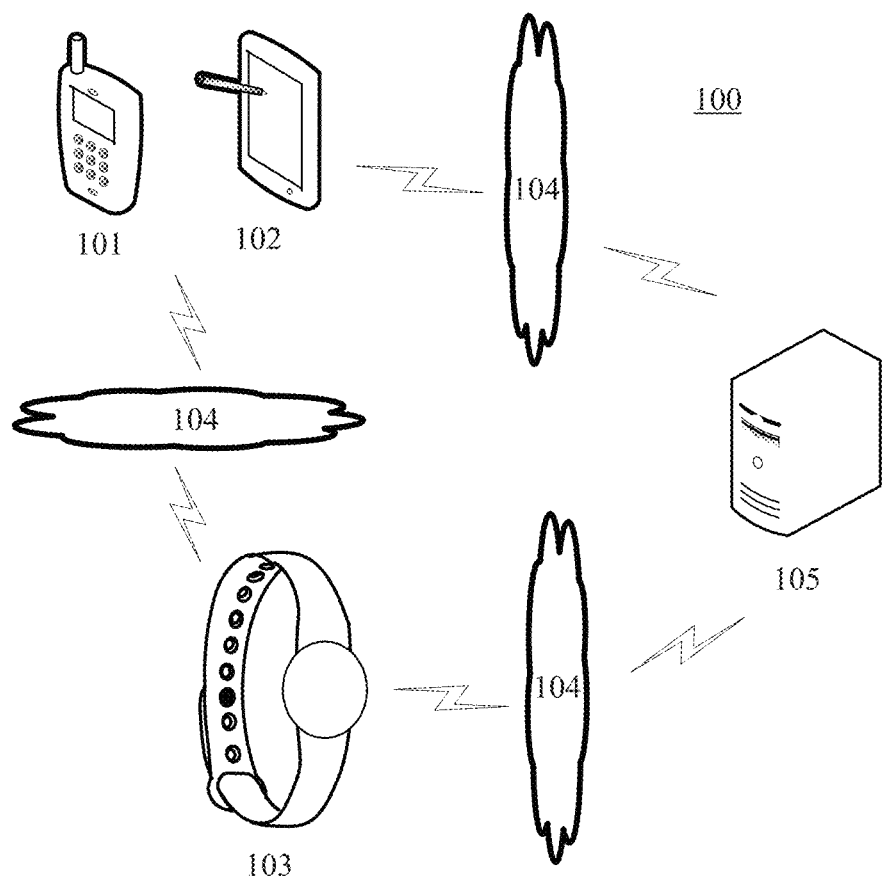
FIG. 1 is a diagram of an exemplary system architecture in which the present disclosure may be implemented.

FIG. 1 illustrates an exemplary system architecture 100 in which an embodiment of an information processing method or a wearable device of the present disclosure may be implemented.

As shown in FIG. 1, the system architecture 100 may include terminals 101, 102, a wearable device 103, a network 104, and a server 105. The network 104 serves as a medium providing a communication link between the terminals 101, 102, the wearable device 103, and the server 105. The network 104 may include various types of connections, such as wired or wireless communication links, or optical fibers.

A user may interact with the server 105 via the network 104 using the terminals 101, 102 and/or the wearable device 103 to receive or send messages. Various communication client applications, such as search applications, shopping applications, instant communication tools, mailbox clients, or social platform software, may be installed on the terminals 101, 102 and the wearable device 103.

Here, the terminals 101, 102 may be hardware or software. When the terminals 101, 102 are hardware, they may be various electronic devices having display screens, including but not limited to smart phones, tablets, e-book readers, laptop portable computers, desktop computers. When the terminals 101, 102 are software, they may be installed in the above-listed electronic devices. They may be implemented as a plurality of software or software modules (e.g., a plurality of software or software modules for providing distributed services) or as a single software or software module, which is not specifically limited in the present disclosure.

The wearable device 103 may be a wearable device used by the user. Specifically, the user may interact with the terminals 101, 102 or the server 105 using the wearable device 103.

The server 105 may be a server that provides various services, such as a backend server that provides support for the terminals 101, 102 and the wearable device 103. The backend server may perform processing such as analysis on received data, and feed back the processing result to the wearable device and/or the terminal device.

It should be noted that the information processing method provided by the embodiments of the present disclosure may be generally performed by the wearable device 103.

It should be understood that the numbers of terminals, wearable devices, networks, and servers in FIG. 1 are merely illustrative. Any number of terminals, wearable devices, networks and servers may be provided based on the actual requirements.

Figure 2:
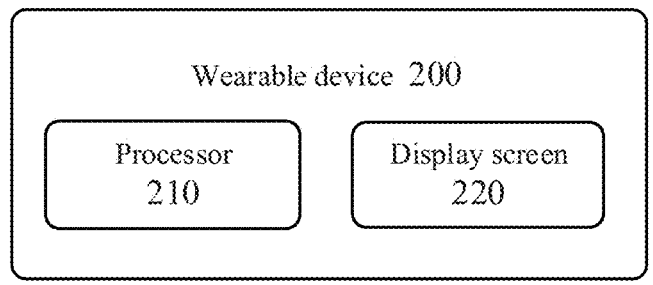
FIG. 2 is a schematic structural diagram of an embodiment of a wearable device according to the present disclosure.

With further reference to FIG. 2, a structure 200 of an embodiment of a wearable device according to the present disclosure is illustrated. The wearable device includes a processor 210 and a display screen 220.

The processor 210 is configured to search for a video file indicated by a video search request, in response to receiving the video search request from a user, and send an identification code for indicating an access link of the video file to the display screen 220.

In the present embodiment, the processor 210 may search for the video file indicated by the video search request in response to receiving the video search request from the user. Then, the processor 210 may send an identification code to the display screen 220, and the identification code may be used to indicate an access link of the video file. Specifically, before transmitting the identification code, the processor 210 may first determine an access link of the video file, and generate an identification code of the access link, and then send the identification code.

Specifically, the video search request is information requesting to search for the video file, and may be sent by the user in the form of voice or text input. The access link is a link to access the video file. The access link may be the download address or storage address of the video file. The video file may be downloaded or cached through the access link. The identification code may distinguish different access links, and may include barcodes. Here, the identification code and the access link have a corresponding relationship, and the access link may be obtained by identifying the identification code.

In some alternative implementations of the present embodiment, the identification code is a QR code.

In this implementation, compared to general identification codes, the QR code contains a larger amount of information, and is capable of transmitting more data types. Therefore, even if the access link contains a variety of characters and the length is long, the QR code can also well transmit the access link.

In some alternative implementations of the present embodiment, the video search request is a voice request; and the processor is further configured to determine a search keyword indicated by the voice request.

The processor 210 in this implementation may determine the search keyword indicated by the voice request, in response to receiving the voice request from the user.

In practice, the processor 210 may determine the search keyword in a variety of ways. For example, the processor 210 may locally convert the audio content of the video search request into text, and then perform natural language parsing on the text to obtain the search keyword. Alternatively, the processor 210 may also send the video search request to the server. In this way, the server may convert the audio content of the video search request into text, and then perform natural language parsing on the text to obtain the search keyword, and return the search keyword to the processor 210.

The video search request is in the form of voice, which eliminates the need for manual operations and makes the interaction between the user and the wearable device simpler and more efficient.

In some alternative implementations of the present embodiment, the processor 210 is further configured to search for the video file based on the search keyword.

In this implementation, the processor 210 may search for a video file with at least one of a name, a subtitle content, or a profile containing the search keyword, in a search webpage or a search application.

The implementation can search through keywords in the voice request to search for video files that are highly compatible with the user's needs, thereby improving the accuracy in searching the video file.

The display screen 220 is configured to display the identification code, so that an electronic device identifying the identification code acquires the access link.

In the present embodiment, if the display screen 220 receives the identification code sent by the processor 210, the identification code may be displayed, so that the electronic device identifying the identification code acquires the access link. The electronic device identifying the identification code here may be an electronic device such as a mobile phone or a tablet, and may have a function of identifying the identification code, and may also be equipped with a camera capable of capturing the identification code.

In practice, the identification of the electronic device may be achieved by scanning the display screen 220 using the camera to identify the identification code.

In this way, the user can cause the display screen 220 of the wearable device to display the identification code by issuing a video search request to the wearable device. In addition, the electronic device may identify the identification code to obtain an access link of the video file.

The wearable device provided by the above embodiments of the present disclosure, although having limited capacity and processing capability, may enable an electronic device that identifies the access link or other electronic device that communicates with the electronic device to play the video, by presenting the access link on the display screen. In addition, the transmission of the access link is realized by displaying the identification code, and the transmission speed is fast and accurate.

Figure 3:
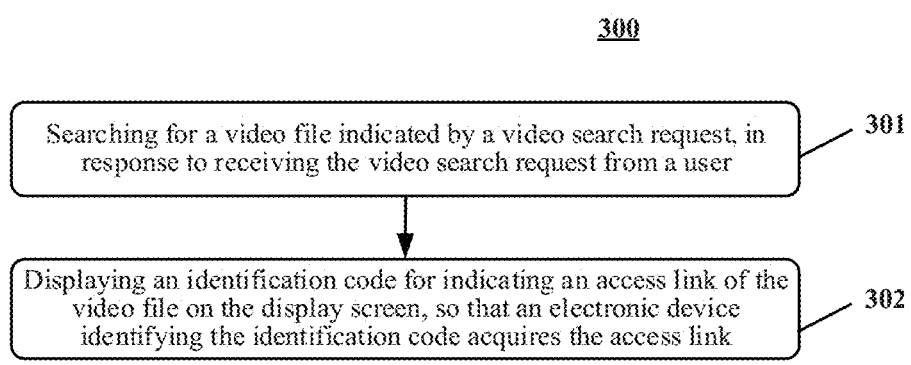
FIG. 3 is a flowchart of an embodiment of an information processing method for a wearable device according to the present disclosure.

With further reference to FIG. 3, a flow 300 of an embodiment of an information processing method for a wearable device is illustrated. The flow 300 of the information processing method for a wearable device includes the following steps.

Step 301, searching for a video file indicated by a video search request, in response to receiving the video search request from a user.

Step 302, displaying an identification code for indicating an access link of the video file on the display screen, so that an electronic device identifying the identification code acquires the access link.

In some embodiments, the video search request is a voice request; the method further includes: determining a voice keyword indicated by the voice request; and the searching for a video file indicated by a video search request, includes: searching for the video file based on the voice keyword.

In some embodiments, the identification code is a QR code.

The method provided by the present embodiment can enrich the functions of the wearable device. Although having limited capacitance and processing capability, the wearable device may transmit the access link so that an electronic device that identifies the access link or other electronic device that communicates with the electronic device plays the video. Furthermore, the user in the present embodiment can interact with the wearable device in the form of voice, eliminating the need for operation and is highly efficient. In addition, in this embodiment, by searching for the keywords in the voice request, a relatively accurate video file can be obtained.

Figure 4:
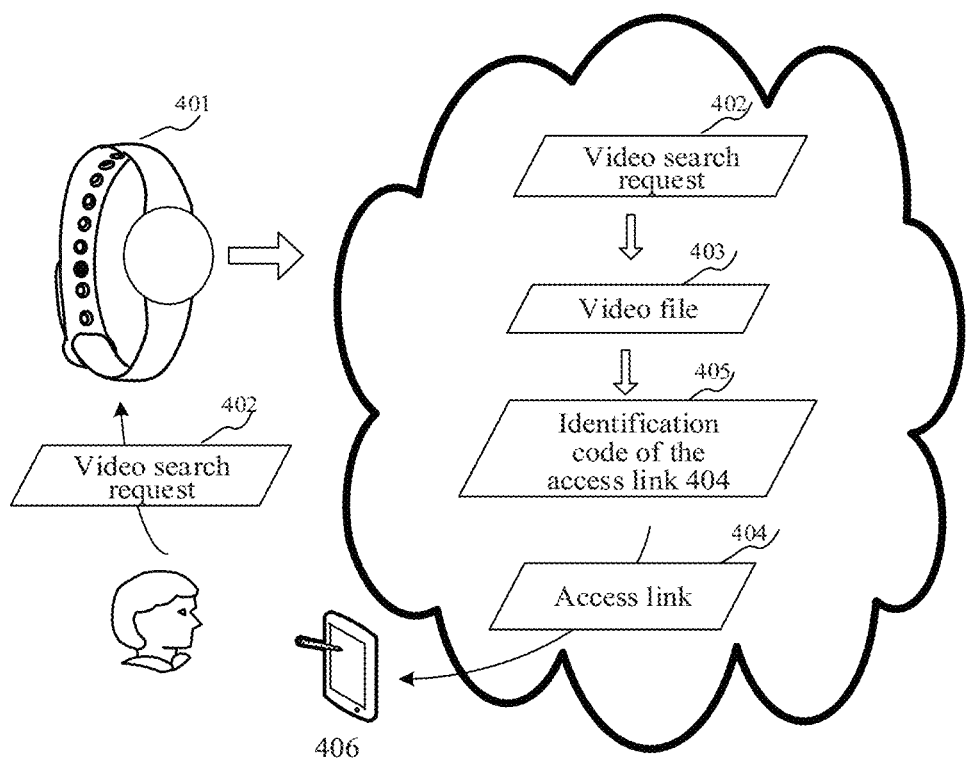
FIG. 4 is a schematic diagram of an application scenario of the information processing method for a wearable device according to the present disclosure.

With further reference to FIG. 4, FIG. 4 is a schematic diagram of an application scenario of the information processing method for a wearable device according to the present embodiment. In the application scenario of FIG. 4, the wearable device includes a display screen. The wearable device 401 searches for a video file 403 indicated by a video search request 402 in response to receiving the user's video search request 402. An identification code 405 for indicating an access link 404 of the video file 403 is displayed on the display screen such that an electronic device 406 identifying the identification code 405 obtains the access link 404.

The wearable device provided by the present embodiment, although having limited capacity and processing capability, may enable an electronic device that identifies the access link or other electronic device that communicates with the electronic device to play the video, by presenting the access link on the display screen. In addition, the transmission of the access link is realized by displaying the identification code, and thus the transmission speed is fast and accurate.

Figure 5:
FIG. 5 is a schematic structural diagram of an embodiment of an information processing apparatus for a wearable device according to the present disclosure.

With further reference to FIG. 5, as an implementation of the method shown in the above figures, the present disclosure provides an embodiment of an information processing apparatus for a wearable device, and the apparatus embodiment corresponds to the method embodiment as shown in FIG. 3, and the apparatus may be specifically applied to various electronic devices.

As shown in FIG. 5, the wearable device of the present embodiment includes a display screen, and the apparatus includes: a searching unit 501, configured to search for a video file indicated by a video search request, in response to receiving the video search request from a user; and a displaying unit 502, configured to display an identification code for indicating an access link of the video file on the display screen, so that an electronic device identifying the identification code acquires the access link.

In the present embodiment, the searching unit 501 may search for a video file indicated by a video search request, in response to receiving the video search request from a user. Then, an access link for indicating the video file is displayed on the display screen. Specifically, the searching unit 501 may first determine the access link of the video file and generate an identification code of the access link. Then, the identification code is displayed.

In the present embodiment, the displaying unit 502 may display the identification code such that the electronic device identifying the identification code acquires the access link. The electronic device identifying the identification code here may be an electronic device such as a mobile phone or a tablet, and may have a function of identifying the identification code, and may also be equipped with a camera capable of capturing the identification code.

In some alternative implementations of the present embodiment, the video search request is a voice request; the apparatus further includes: a determination unit, configured to determine a voice keyword indicated by the voice request; and the searching unit is further configured to: search for the video file based on the voice keyword.

In some alternative implementations of the present embodiment, the identification code is a QR code.

Figure 6:
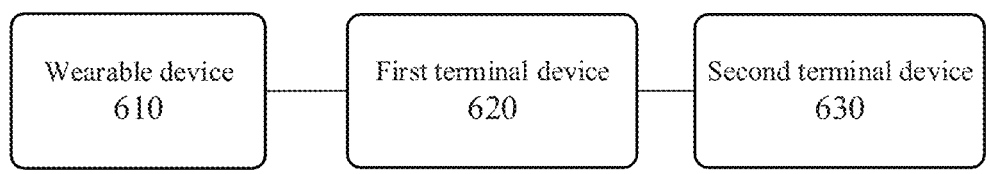
FIG. 6 is a schematic structural diagram of an embodiment of an information processing system according to the present disclosure.

With further reference to FIG. 6, an information processing system 600 is illustrated. The system includes a wearable device 610 having a display screen and a first terminal device 620.

The wearable device 610 is configured to search for a video file indicated by a video search request, in response to receiving the video search request from a user; determine an access link of the video file, and display an identification code for indicating the access link on the display screen; and the first terminal device 620 is configured to identify the identification code to acquire the access link.

The wearable device provided by the present embodiment, although having limited capacitance and poor processing capability, may transmit the access link so that other electronic device plays the video. At the same time, the wearable device transmits the access link through the identification code, so that the terminal device that obtains the identification code or other electronic device that communicates with the terminal device plays the video corresponding to the access link. In addition, the transmission of the access link is realized by displaying the identification code, and thus the transmission speed is fast and accurate.

In some alternative implementations of the present embodiment, the video search request is a voice request; the wearable device 610 is further configured to: determine a search keyword indicated by the voice request; and the wearable device 610 is further configured to: search for the video file based on the search keyword.

In these implementations, the user can interact with the wearable device in the form of voice, eliminating the need for operation and is highly efficient. At the same time, in this embodiment, by searching for the keywords in the voice request, a relatively accurate video file can be obtained.

In some alternative implementations of the present embodiment, the wearable device 610 is further configured to display the QR code of the access link on the display screen; and the first terminal device 620 is further configured to scan the QR code to acquire the access link.

In these implementations, the first terminal device 620 may scan the QR code displayed on the display screen to acquire the access link by identifying the QR code. Here, the first terminal device 620 may be the terminal in FIG. 1.

In some alternative implementations of the present embodiment, the first terminal device 620 is further configured to scan the QR code displayed on the display screen to acquire the access link, and acquire and play the video file based on the access link.

In these implementations, the first terminal device 620 may download or cache the video file from the address indicated by the access link, and then play the video file.

In practice, the first terminal device 620 may have a display screen. Thus, by identifying the QR code displayed on the wearable device 610, the video file may be played on the display screen of the first terminal device 620.

Compared to general identification codes, the QR code contains a larger amount of information, and is capable of transmitting more data types. Therefore, even if the access link contains a variety of characters and the length is long, the QR code can also well transmit the access link.

In some alternative implementations of the present embodiment, the first terminal device 620 is further configured to send the access link to a second terminal device 630, so that the second terminal device 630 plays the video file based on the access link.

In these implementations, the second terminal device 630 may download or cache the video file from the address indicated by the access link after receiving the access link. In this way, based on the identification code displayed on the wearable device, not only the first terminal device may play the video, but also other terminal device that is in communication with the first terminal device may play the video.

In some alternative implementations of the present embodiment, the first terminal device 620 is further configured to send a video storage request including the access link to a cloud server.

In these implementations, the terminal device 620 may send the video storage request including the access link to the cloud server, so that the cloud server can store the video file after receiving the video storage request. The video storage request is information that requests the server to enable the cloud server to store the video file. In this way, the first terminal device or other terminal device may acquire the video file from the cloud server at any time, and then play the video file.

In some alternative implementations of the present embodiment, the system further includes a second terminal device 630; the first terminal device 620 is further configured to send a video play request to the second terminal device 630; and the second terminal device 630 is configured to acquire and play the video file from the cloud server, in response to receiving the video play request.

In these implementations, if the second terminal device 630 receives the video play request, the video file may be downloaded or cached from the cloud server, and then played. Thus, the electronic device that plays the video file is not limited to the first terminal device that identifies the identification code, and may also be various electronic devices that may acquire resources from the cloud server.

In some application scenarios of the implementation, the size of the display screen of the second terminal device 630 is larger than the size of the display screen of the first terminal device 620.

In these application scenarios, the size of the display screen of the second terminal device 630 is larger, and the video file can be better presented.

Figure 7:
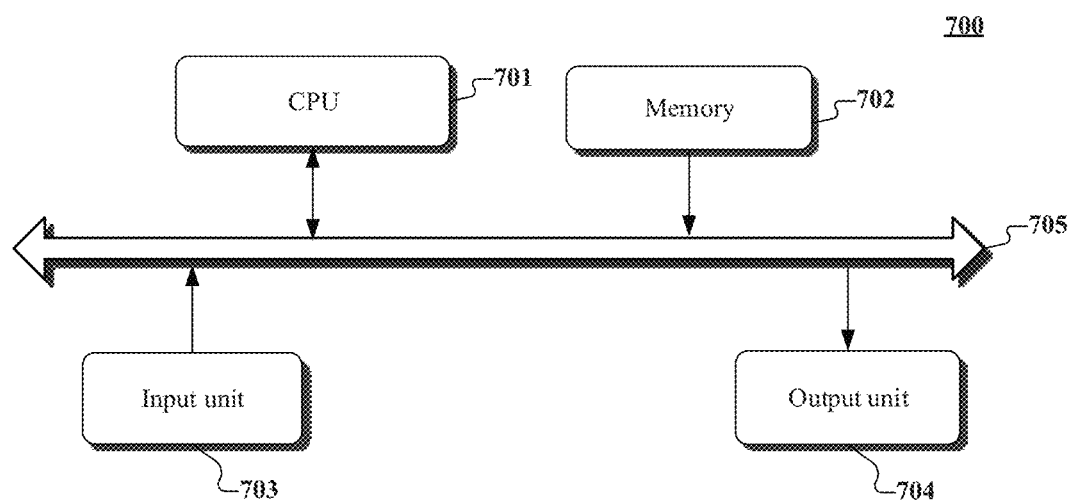
FIG. 7 is a schematic structural diagram of a computer system adapted to implement the wearable device of embodiments of the present disclosure.

With further reference to FIG. 7, a hardware structure schematic diagram of a wearable device 500 is shown.

As shown in FIG. 7, the wearable device 700 includes a central processing unit (CPU) 701, a memory 702, an input unit 703, and an output unit 704. Here, the CPU 701, the memory 702, the input unit 703, and the output unit 704 are connected to each other through a bus 705. Here, the method according to the present disclosure may be implemented as a computer program and stored in the memory 702. The CPU 701 in the wearable device 700 specifically implements the view display function defined in the method of the present disclosure by invoking the above computer program stored in the memory 702. In some implementations, the input unit 703 may be a device such as a sensor that may be used to obtain wrist motion posture information, and the output unit 704 may be a display screen that may be used to display a view. Thus, the CPU 701 may control the input unit 703 to acquire the motion posture information of the wrist from the outside when the computer program is invoked to execute the view display function, and control the output unit 704 to display the view.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: search for a video file indicated by a video search request, in response to receiving the video search request from a user; and display an identification code for indicating an access link of the video file on the display screen, so that an electronic device identifying the identification code acquires the access link.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A wearable device, the wearable device comprising a processor and a display screen,
the processor being configured to send a voice request for a video search request to a server for the sever to convert audio content of the voice request into text and perform natural language parsing on the text to obtain a search keyword, receive the search keyword from the server, search for a video file with at least one of a name, a subtitle content, or a profile containing the search keyword, determine an access link of the video file, generate an identification code of the access link, and send the identification code to the display screen, the identification code including a barcode; and
the display screen being configured to display the barcode, so that an electronic device having a larger display screen that is larger in size compared to a size of the display screen of the wearable device and a camera scans the barcode displayed on the display screen of the wearable device to thereby acquire the access link of the video file and to download or cache the video file through the access link and play the video file on the larger display screen of the electronic device.

2. The wearable device according to claim 1, wherein the identification code further includes a quick response (QR) code.

3. An information processing method for a wearable device, the wearable device comprising a display screen, the method comprising:
- sending a voice request for a video search request to a server for the sever to convert audio content of the voice request into text and perform natural language parsing on the text to obtain a search keyword;
- receiving the search keyword from the server;
- searching for a video file with at least one of a name, a subtitle content, or a profile containing the search keyword;
- determining an access link of the video file;
- generating an identification code of the access link; and
- displaying the identification code on the display screen, the identification code including a barcode;
- using, an electronic device having a larger display screen that is larger in size compared to a size of the display screen of the wearable device and a camera to scan the barcode displayed on the display screen of the wearable device to thereby acquire the access link of the video file and to download or cache the video file through the access link and play the video file on the larger display screen of the electronic device.

4. The method according to claim 3, wherein the identification code further includes a quick response (QR) code.

5. A non-transitory computer readable storage medium, storing a computer program thereon, the program, when executed by a processor, implements the method according to claim 3.

6. An information processing system, the system comprising a first terminal device and a wearable device having a display screen;
- the wearable device being configured to send a voice request for a video search request to a server for the sever to convert audio content of the voice request into text and perform natural language parsing on the text to obtain a search keyword, receive the search keyword from the server, search for a video file with at least one of a name, a subtitle content, or a profile containing the search keyword determine an access link of the video file, generate an identification code of the access link, and display the identification code on the display screen, the identification code including a barcode; and
- the first terminal device having a larger display screen that is larger in size compared to a size of the display screen of the wearable device and a camera being configured to scan the barcode displayed on the display screen of the wearable device to thereby acquire the access link of the video file and to download or cache the video file through the access link and play the video file on the larger display screen of the electronic device.

7. The system according to claim 6, wherein the identification code further includes a quick response (QR) code;
- the wearable device is further configured to display the QR code of the access link on the display screen; and
- the first terminal device is further configured to scan the QR code to acquire the access link.

8. The system according to claim 7, wherein,
- the first terminal device is further configured to send the access link to a second terminal device, so that the second terminal device plays the video file based on the access link.

9. The system according to claim 6, wherein,
- the first terminal device is further configured to scan the QR code displayed on the display screen to acquire the access link, and acquire and play the video file based on the access link.

10. The system according to claim 6, wherein,
- the first terminal device is further configured to send a video storage request including the access link to a cloud server.

11. The system according to claim 10, wherein the system further comprises a second terminal device;
- the first terminal device is further configured to send a video play request to the second terminal device; and
- the second terminal device is configured to acquire and play the video file from the cloud server, in response to receiving the video play request.

* * * * *